US012462791B2

(12) United States Patent
Han et al.

(10) Patent No.: US 12,462,791 B2
(45) Date of Patent: Nov. 4, 2025

(54) SMART VOICE DEVICE WAKEUP TEST APPARATUS

(71) Applicant: GOERTEK INC., Shandong (CN)

(72) Inventors: Feifei Han, Shandong (CN); Chao Xie, Shandong (CN); Kaifa Shu, Shandong (CN)

(73) Assignee: GOERTEK INC., Shandong (CN)

(*) Notice: Subject to any disclaimer, the term of this patent is extended or adjusted under 35 U.S.C. 154(b) by 302 days.

(21) Appl. No.: 18/246,008

(22) PCT Filed: Nov. 7, 2020

(86) PCT No.: PCT/CN2020/127352
§ 371 (c)(1),
(2) Date: Mar. 20, 2023

(87) PCT Pub. No.: WO2022/062095
PCT Pub. Date: Mar. 31, 2022

(65) Prior Publication Data
US 2023/0360637 A1 Nov. 9, 2023

(30) Foreign Application Priority Data
Sep. 22, 2020 (CN) ........................ 202011000463.X

(51) Int. Cl.
*G10L 15/01* (2013.01)
*H04R 29/00* (2006.01)

(52) U.S. Cl.
CPC ............ *G10L 15/01* (2013.01); *H04R 29/004* (2013.01)

(58) Field of Classification Search
CPC .............................. G10L 15/01; H04R 29/004
See application file for complete search history.

(56) References Cited

U.S. PATENT DOCUMENTS 5,771,298 A * 6/1998 Davis ..................... H04R 25/30 381/151
2014/0328489 A1* 11/2014 Ziegler ................ H04R 29/004 381/58
2017/0251317 A1 8/2017 Ebenezer et al.

FOREIGN PATENT DOCUMENTS

CN 1006114 B * 12/1989
CN 203435146 U 2/2014
(Continued)

OTHER PUBLICATIONS

Fujita et al., "Machine Translation of JP-2005348098-A, Device and Method for Inspecting Bone Conduction Microphone", Dec. 15, 2005, Clarivate Analytics, pp. 1-9. (Year: 2005).*
(Continued)

*Primary Examiner* — Daniel R Sellers
(74) *Attorney, Agent, or Firm* — Ingrassia Fisher & Lorenz, LLP

(57) ABSTRACT

A wake-up test device for intelligent voice equipment is taught herein. The wake-up test device includes a fixed frame. The wake-up test device further includes a first clamping assembly arranged on the fixed frame. The wake-up test device further includes a second clamping assembly arranged on the fixed frame. The first clamping assembly and the second clamping assembly can be brought to be close to or far away from each other. The wake-up test device further includes a vibration exciter arranged on the first clamping assembly or the second clamping assembly. An object to be tested is placed on the vibration exciter, the first clamping assembly and the second clamping assembly are brought to be close to each other and fix the object to be tested on the vibration exciter, so that the object to be tested attaches to the vibration exciter.

9 Claims, 3 Drawing Sheets

(56) References Cited

FOREIGN PATENT DOCUMENTS

| | | | | | |
|---|---|---|---|---|---|
| CN | 104053973 | A | | 9/2014 | |
| CN | 104080036 | A | | 10/2014 | |
| CN | 105704635 | A | | 6/2016 | |
| CN | 106507262 | A | | 3/2017 | |
| CN | 108318200 | A | | 7/2018 | |
| CN | 108696622 | A | | 10/2018 | |
| CN | 110708654 | A | * | 1/2020 | ........... H04R 29/001 |
| CN | 210491203 | U | | 5/2020 | |
| CN | 111405450 | A | | 7/2020 | |
| CN | 111432324 | A | | 7/2020 | |
| CN | 111683316 | A | | 9/2020 | |
| JP | H11234798 | A | | 8/1999 | |
| JP | 2005348098 | A | * | 12/2005 | |
| KR | 100900161 | B1 | | 6/2009 | |

OTHER PUBLICATIONS

Lin, Xiang-rong, "Machine Translation of CN-1006114-B, Simulate Human Vibration Apparatus", Dec. 13, 1989, Clarivate Analytics, pp. 1-5. (Year: 1989).*

Deng et al., "Machine Translation of CN-110708654-A, For Test Fixture of Bone Conduction Earphone Microphone", Jan. 17, 2020, Clarivate Analytics, pp. 1-8. (Year: 2020).*

* cited by examiner

SMART VOICE DEVICE WAKEUP TEST APPARATUS

CROSS-REFERENCE TO RELATED APPLICATIONS

This application is a U.S. National-Stage entry under 35 U.S.C. § 371 based on International Application No. PCT/CN2020/127352, filed Nov. 7, 2020 which was published under PCT Article 21(2) and which claims priority to Chinese Application No. 202011000463.X, filed Sep. 22, 2020, which are all hereby incorporated herein in their entirety by reference.

TECHNICAL FIELD

This application pertains to the field of audio testing, in particular to a wake-up test device for intelligent voice equipment.

BACKGROUND

In the conventional test devices for waking up an intelligent voice equipment, an artificial mouth is used to play a wake-up command to test whether the intelligent voice equipment can be woken. However, for an equipment using a bone conduction microphone, since it does not directly contact the object that is vibratile, it cannot pick up a vibration signal, so it cannot perform a wake-up operation. Therefore, such a test device is not applicable to an equipment to be woken up using a bone conduction microphone device. In addition, other objects, desirable features and characteristics will become apparent from the subsequent summary and detailed description, and the appended claims, taken in conjunction with the accompanying drawings and this background.

SUMMARY

A main object of the present disclosure is to provide a wake-up test device for intelligent voice equipment, so as to solve the technical problem that the conventional wake-up test devices for intelligent voice equipment cannot wake up the equipment using a bone conduction microphone.

To achieve the object, the present disclosure provides a wake-up test device for intelligent voice equipment, which comprises:

a fixed frame;

a first clamping assembly arranged on the fixed frame;

a second clamping assembly arranged on the fixed frame, wherein the first clamping assembly and the second clamping assembly can be brought to be close to or far away from each other; and a vibration exciter arranged on the first clamping assembly or the second clamping assembly, wherein an object to be tested is placed on the vibration exciter, the first clamping assembly and the second clamping assembly are brought to be close to each other and fix the object to be tested on the vibration exciter, so that the object to be tested attaches to the vibration exciter.

Preferably, the first clamping assembly comprises:

a fixed member arranged at an end of the fixed frame that is away from the second clamping assembly; and a mounting member arranged at an end of the fixed member that faces toward the second clamping assembly, wherein the mounting member is provided thereon with an annular groove, the vibration exciter is arranged on the mounting member, and the vibration exciter is located at a center position of the annular groove.

Preferably, the mounting member penetrates through the fixed member and is slidably connected with the fixed member, and the first clamping assembly comprises:

a first lifting mechanism arranged on the fixed frame or the fixed member, wherein the first lifting mechanism is connected with the mounting member and is used to drive the mounting member to move close to or away from the second clamping assembly.

Preferably, the first lifting mechanism comprises:

a first support plate fixed on the fixed frame or the fixed member; and a first lifting rod, wherein one end of the first lifting rod is connected with the mounting member, the other end of the first lifting rod penetrates through the first support plate and is threadedly connected with the first support plate, an end of the first lifting rod that is away from the first support plate is externally connected with a power component used to drive the first lifting rod to rotate.

Preferably, the first lifting mechanism further comprises:

a fixed rod, wherein one end of the fixed rod is fixed on the fixed member, and the first support plate is arranged on the fixed rod;

a driving wheel rotatably arranged on an end of the fixed rod that is away from the second clamping assembly; and a driven wheel arranged on an end of the first lifting rod that is away from the second clamping assembly, wherein the driving wheel is connected with the driven wheel through belt transmission, and the driving wheel is externally connected with a power component.

Preferably, the second clamping assembly comprises:

a pressing member; and a second lifting mechanism arranged on an end of the fixed frame that is away from the first clamping assembly, wherein the pressing member is arranged on an end of the second lifting mechanism that faces toward the first clamping assembly, and the second lifting mechanism is used to drive the pressing member to move close to or away from the first clamping assembly.

Preferably, the second lifting mechanism comprises:

a second support plate;

a connecting rod, wherein two ends of the connecting rod are respectively connected with the second support plate and the pressing member; and at least one second lifting rod, wherein one end of the second lifting rod is rotatably connected with the fixed frame, the other end of the second lifting rod penetrates through the second support plate and is threadedly connected with the second support plate, the second lifting rod is externally connected with a power component used to drive the second lifting rod to rotate.

Preferably, there are two second lifting rods, and the second lifting mechanism further comprises:

two synchronous wheels respectively arranged rotatably on ends of the two second lifting rods that face toward the pressing member, wherein the two synchronous wheels are connected together through belt transmission, and one of the second lifting rods is externally connected with the power component.

Preferably, the wake-up test device for intelligent voice equipment further comprises:

an auxiliary clamping mechanism arranged on the first clamping assembly and/or the second clamping assembly and used to fix the object to be tested on the vibration exciter.

Preferably, the wake-up test device for intelligent voice equipment further comprises:

a first air bag arranged on an end of the first clamping assembly that faces toward the second clamping assembly, wherein the first air bag has an annular structure, and the vibration exciter is located in a center position of the first air bag; and a second air bag arranged on an end of the second clamping assembly that faces toward the first clamping assembly.

In the technical solution of the present disclosure, the fixed frame is provided thereon with the first clamping assembly and the second clamping assembly, the first clamping assembly and the second clamping assembly face toward each other and can be far away or close to each other; the vibration exciter is fixedly provided on the first clamping assembly or the second clamping assembly and is electrically connected with a main board inside the bone conduction microphone; after the bone conduction microphone is placed on the clamping assembly equipped with the vibration exciter, the bone conduction microphone attaches to a vibration surface of the vibration exciter, and the first clamping assembly and the second clamping assembly are brought to be close to each other to fix the bone conduction microphone on the vibration exciter. During testing, the vibration surface of the vibration exciter picks up the vibration signal of the bone conduction microphone, and the bone conduction microphone picks up the excitation signal of the vibration exciter and transmits it to the main board to wake up the voice wake-up system. A tester can check whether the voice wake-up system is woken to determine whether the wake-up function in the bone conduction microphone is effective. The above configuration can effectively transfer the vibration of the bone conduction microphone to the vibration exciter, the vibration signal can be accurately obtained, the error of wake-up test can be reduced, and the function of the bone conduction microphone transmitter can be accurately evaluated.

BRIEF DESCRIPTION OF DRAWINGS

The present invention will hereinafter be described in conjunction with the following drawing figures, wherein like numerals denote like elements, and.

Figure 1:
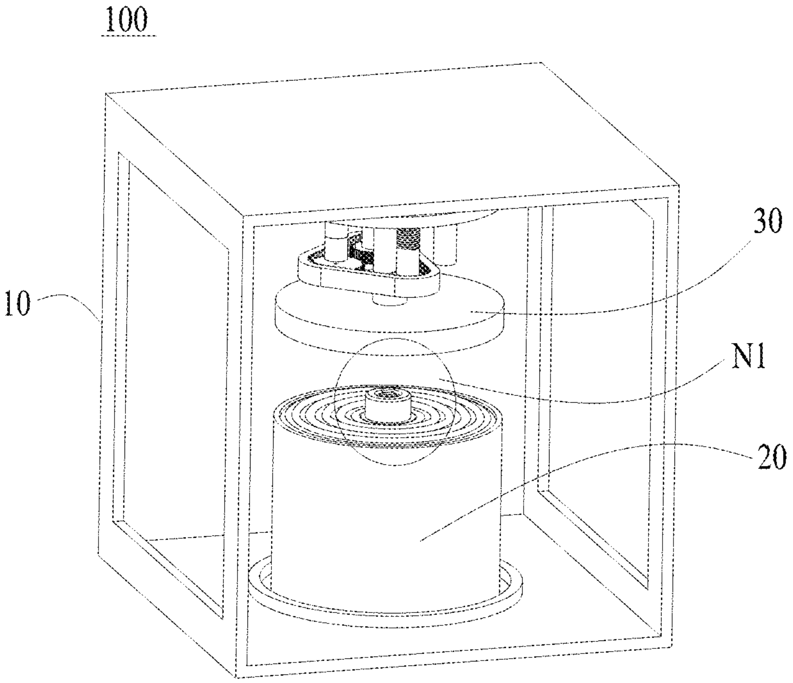
FIG. 1 is a schematic diagram of the structure of an embodiment of the wake-up test device for intelligent voice equipment of the present disclosure.

In the drawings: 100, wake-up test device for intelligent voice equipment; 10, fixed frame; 20, first clamping assembly; 21 fixed member; 22, mounting member; 23, first lifting mechanism; 231, first support plate; 232, first lifting rod; 233, fixed rod; 234, driving wheel; 235, driven wheel; 30, second clamping assembly; 31, pressing member; 32, second lifting mechanism; 321, second support plate; 322, connecting rod; 323, second lifting rod; 324, synchronous wheel; 325, driving rod; 326, guiding rod; 327, driving wheel; 40, vibration exciter; 51 first air bag; 52 second air bag; A, annular groove.

The object realization, functional features and advantages of the present disclosure will be further described in combination with the embodiments and with reference to the accompanying drawings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

It should be noted that all directional indications (such as up, down, left, right, front, back, etc.) in the embodiments of the present disclosure are only used to explain the relative positional relationship, the movement situation, etc. among various components under a specific posture (as shown in the drawings). If the specific posture changes, the directional indication will also change accordingly.

In addition, in the present disclosure, the terms "first", "second" and the like are used for descriptive purposes only and are not to be construed as indicating or implying relative importance or implicitly indicating the number of indicated technical features. Thus, a feature defined with "first" or "second" may explicitly or implicitly include at least one such a feature. In addition, the technical solutions in various embodiments of the present disclosure can be combined with each other if such combination is realizable to a person of ordinary skill in the art. When a combination of technical solutions is contradictory or cannot be realized, it should be considered that such a combination of technical solutions does not exist and is not within the scope of protection claimed in the present disclosure.

The present disclosure provides a wake-up test device 100 for intelligent voice equipment.

Figure 2:
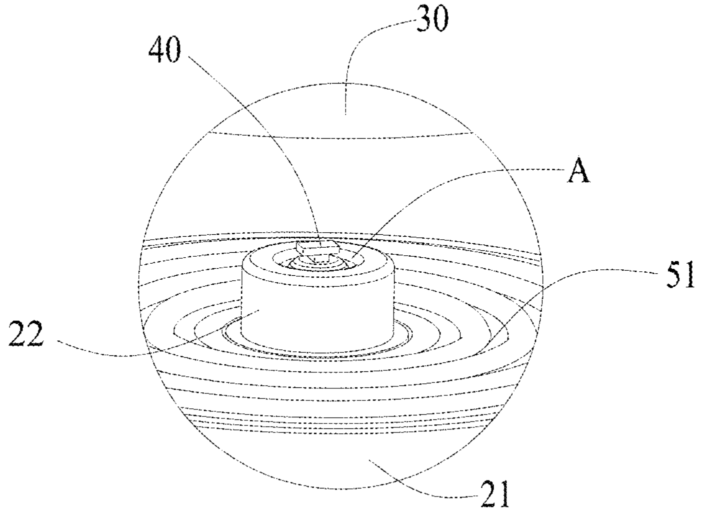
FIG. 2 is a partial enlarged view of N1 in FIG. 1.

As shown in FIGS. 1 to 2, the wake-up test device 100 for intelligent voice equipment comprises: a fixed frame 10, a first clamping assembly 20 arranged on the fixed frame 10, a second clamping assembly 30 arranged on the fixed frame 10, and a vibration exciter 40 arranged on the first clamping assembly 20 or the second clamping assembly 30. The first clamping assembly 20 and the second clamping assembly 30 can be brought to be close to or far away from each other. An object to be tested is placed on the vibration exciter 40. The first clamping assembly 20 and the second clamping assembly 30 are brought to be close to each other and fix the object to be tested on the vibration exciter 40, so that the object to be tested attaches to the vibration exciter 40.

In the prior art, the simulated human head device used for testing a bone conduction equipment only has a voice member disposed in the simulated mouth and does not have a vibration member. Thus, when this simulated human head device is used to test the bone conduction equipment, only the sound signal of the voice member can be obtained, the bone conduction sensor cannot detect a vibration signal, and thus larger errors will occur, and it is difficult to accurately evaluate the function of the voice transmitter of the bone conduction headphone.

In view of this, in the wake-up test device 100 for intelligent voice equipment of this embodiment, the fixed frame 10 is provided thereon with the first clamping assembly 20 and the second clamping assembly 30. The first clamping assembly 20 and the second clamping assembly 30 face toward each other and can be far away or close to each other. For example, the first clamping assembly 20 is fixed on the fixed frame 10, while the second clamping assembly 30 is provided on the fixed frame 10 and can be lifted and lowered; alternatively, the first clamping assembly 20 is provided on the fixed frame 10 and can be lifted and lowered, while the second clamping assembly 30 is fixed on the fixed frame 10; alternatively, both the first clamping assembly 20 and the second clamping assembly 30 are provided on the fixed frame 10 and can be lifted and lowered, which is not limited here. In order to detect the vibration of the object to be tested, a main board is provided inside the object to be tested, and the main board is integrated with a voice wake-up system. Taking the bone conduction microphone as an example of the object to be tested, the vibration exciter 40 is fixedly provided on the first clamping assembly 20 or the second clamping assembly 30 and is electrically connected with the main board inside the bone conduction microphone. After the bone conduction microphone is placed on the clamping assembly equipped with the vibration exciter 40, the bone conduction microphone attaches to the vibration surface of the vibration exciter 40, and the first clamping assembly 20 and the second clamping assembly 30 are brought to be move close to each other to fix the bone conduction microphone on the vibration exciter 40. During testing, the vibration surface of the vibration exciter 40 picks up the vibration signal of the bone conduction microphone, and the bone conduction microphone picks up the excitation signal of the vibration exciter 40 and transmits it to the main board to wake up the voice wake-up system. The tester can check whether the voice wake-up system is woken to determine whether the wake-up function in the bone conduction microphone is effective. The above configuration can effectively transfer the vibration of the bone conduction microphone to the vibration exciter 40, the vibration signal can be accurately obtained, the error of wake-up test can be reduced, and the function of the bone conduction microphone transmitter can be accurately evaluated.

It will be appreciated that the fixed frame 10 may have a square structure to facilitate multi-directional placement and realize multi-scene simulation testing.

Figure 3:
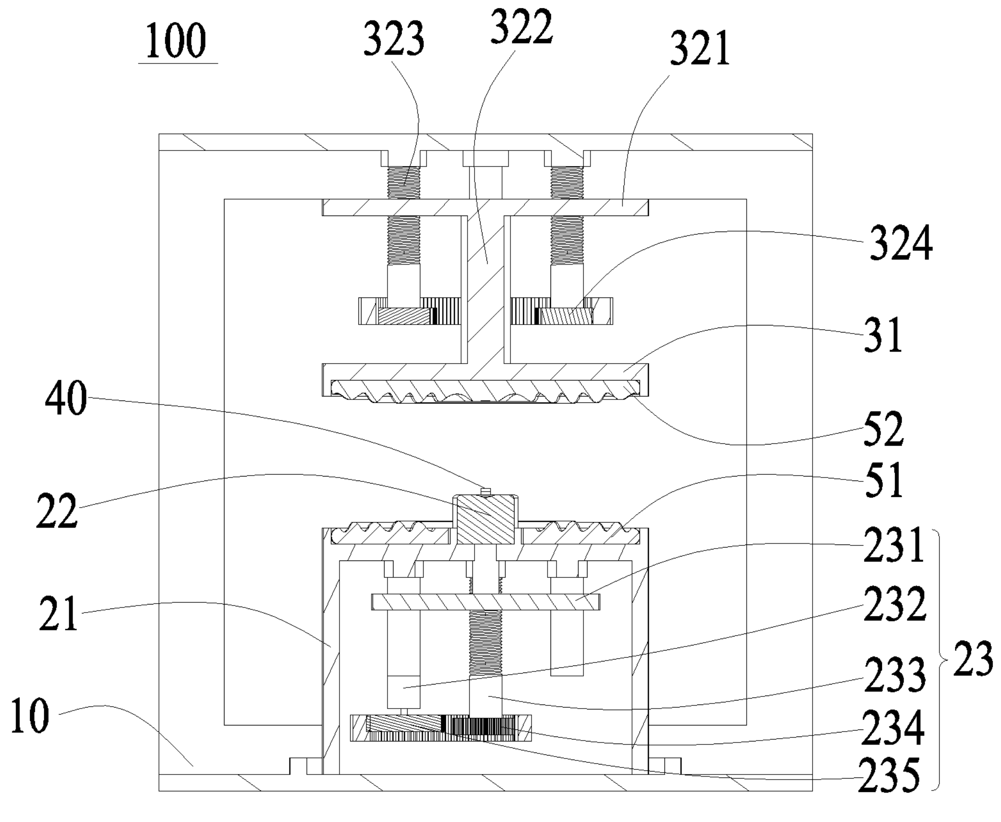
FIG. 3 is a schematic diagram of the structure of another embodiment of the wake-up test device for intelligent voice equipment of the present disclosure.

As shown in FIG. 3, specifically, the first clamping assembly 20 comprises: a fixed member 21 arranged at an end of the fixed frame 10 that is away from the second clamping assembly 30, and a mounting member 22 arranged at an end of the fixed member 21 that faces toward the second clamping assembly 30. The mounting member 22 is provided thereon with an annular groove A, and the center position of the annular groove A forms a fixing and clamping end. The vibration exciter 40 is arranged on the mounting member 22, and is located at the center position of the annular groove A. In this embodiment, the fixed member 21 may be used as a stage for carrying an object. Since the bone conduction microphone can have various shapes, in order to fixing the bone conduction microphone on the first clamping assembly 20, the mounting member 22 may be arranged on the fixed member 21, and the annular groove A may be formed on the mounting member 22. The annular groove A is used to fix bone conduction microphones with different shapes, such as a circular structure, etc. The vibration exciter 40 is fixed at the center of the annular groove A, thereby ensuring that the vibration surface of the vibration exciter 40 fully attaches to the bone conduction microphone.

It will be appreciated that the vibration exciter 40 is placed at the center position of the fixing and clamping end of the mounting member 22, and the fixed frame 10 may be further provided thereon with an infrared ranging device. After the object to be tested is fixed, the distance between the object to be tested and the vibration surface of the vibration exciter 40 may be set according to the infrared ranging device.

In addition, the vibration exciter 40 is detachably arranged on the mounting member 22 to facilitate replacement according to different shapes of objects to be tested. The mounting member 22 may be loaded with various types of vibration exciters 40, such as a piezoelectric vibration exciter 40, an electromagnetic vibration exciter 40, and other types of mechanical driving exciters, which may be selected according to actual needs. The vibration surface of the vibration actuator 40 is rigid, but its material may be varied, such as metal, ceramic, etc.

Specifically, the mounting member 22 penetrates through the fixed member 21 and is slidably connected with the fixed member 21. The first clamping assembly 20 comprises a first lifting mechanism 23 arranged on the fixed frame 10 or the fixed member 21. The first lifting mechanism 23 is connected with the mounting member 22 and is used to drive the mounting member 22 to move close to or away from the second clamping assembly 30. In this embodiment, in order to adjusting the spacing between the mounting member 22 and the second clamping assembly 30 so as to adjust the degree of tightness or looseness between the bone conduction microphone and the excitation vibrator, the mounting member 22 may be configured to penetrate through the fixed member 21 and to be slidably connected with the fixed member 21, and the first lifting mechanism 23 may be provided on the fixed frame 10 or the fixed member 21. The first lifting mechanism 23 may be a cylinder, etc., and is used to drive the mounting member 22 to move close to or away from the second clamping assembly 30. After the bone conduction microphone is pressed onto the fixed member 21, the degree of tightness or looseness between the vibration exciter 40 and the bone conduction microphone can be adjusted through the first lifting mechanism 23 to simulate the degree of fit between the bone conduction microphone and the human skin, thereby improving the detection accuracy.

It will be appreciated that the fixed member 21 may be a hollow cylindrical structure, and the first lifting mechanism 23 is fixedly arranged inside the fixed member 21, and is fixedly connected with the inner wall of the fixed member 21 to reduce the space occupancy rate of the first lifting mechanism 23 and prevent external dust from entering the inside of the fixed member 21 and damaging the first lifting mechanism 23.

Specifically, the first lifting mechanism 23 comprises a first support plate 231 and a first lifting rod 232. The first support plate 231 is fixed on the fixed frame 10 or the fixed member 21. One end of the first lifting rod 232 is connected with the mounting member 22, and the other end of the first lifting rod 232 penetrates through the first support plate 231 and is threadedly connected with the first support plate 231. An end of the first lifting rod 232 that is away from the first support plate 231 is externally connected with a power component (not shown in the figure) used to drive the first lifting rod 232 to rotate. In this embodiment, taking the fixed member 21 being a hollow cylindrical structure as an example, the first support plate 231 is fixed on the inner wall of the fixed member 21, and the first lifting rod 232 is provided. The first lifting rod 232 may be a screw rod, one end of the first lifting rod 232 is fixedly connected with the end of the mounting member 22 that is away from the second clamping assembly 30, and the other end of the first lifting rod 232 penetrates through the first support plate 231 and is threadedly connected with the first support plate 231. The first lifting rod 232 may be connected with a power component such as a motor to drive the first lifting rod 232 to rotate by the power component to raise or lower the mounting member 22.

Specifically, the first lifting mechanism 23 further comprises: a fixed rod 233, a driving wheel 234 and a driven wheel 235. One end of the fixed rod 233 is fixed on the fixed member 21, and the first support plate 231 is arranged on the fixed rod 233. The driving wheel 234 is rotatably arranged on an end of the fixed rod 233 that is away from the second clamping assembly 30. The driven wheel 235 is arranged on an end of the first lifting rod 232 that is away from the second clamping assembly 30. The driving wheel 234 is connected with the driven wheel 235 through belt transmission, and the driving wheel 234 is externally connected with a power component. In this embodiment, in order to improve the displacement accuracy of the mounting member 22, the fixed rod 233 may be provided on the fixed member 21. There may be at least two fixed rods 233, the two fixed rods 233 may be provided at an interval, and two ends of the first support plate 231 are fixed on the fixed rods 233. The driving wheel 234 is arranged at the end of the fixed rod 233 that is away from the second clamping assembly 30, the driven wheel 235 is arranged at the end of the first lifting rod 232 that is away from the second clamping assembly 30, and the driving wheel 234 and the driven wheel 235 are connected through belt transmission or through gear transmission. The driving wheel 234 is externally connected with a power component, such as a motor, and the displacement accuracy of the mounting member 22 can be controlled by controlling the speed of the motor.

Figure 4:
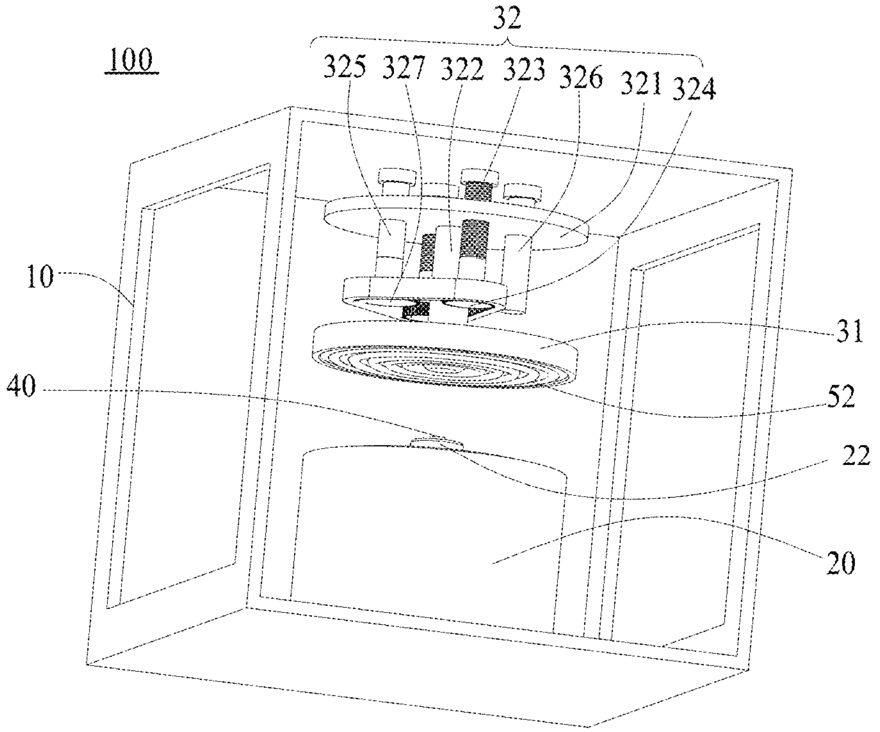
FIG. 4 is a schematic diagram of the structure of yet another embodiment of the wake-up test device for intelligent voice equipment of the present disclosure.

As shown in FIG. 4, specifically, the second clamping assembly 30 comprises a pressing member 31 and a second lifting mechanism 32. The second lifting mechanism 32 is arranged on an end of the fixed frame 10 that is away from the first clamping assembly 20. The pressing member 31 is arranged on an end of the second lifting mechanism 32 that faces toward the first clamping assembly 20. The second lifting mechanism 32 is used to drive the pressing member 31 to move close to or away from the first clamping assembly 20. In this embodiment, the second lifting mechanism 32 of the second clamping assembly 30 is arranged on the end of the fixed frame 10 that is away from the first clamping assembly 20, and is fixedly connected with the pressing member 31 to drive the pressing member 31 move close to or away from the first clamping assembly 20. After the bone conduction microphone attaches to the vibration surface of the vibration exciter 40, the second lifting mechanism 32 can be controlled to drive the pressing member 31 to press the bone conduction microphone onto the first clamping assembly 20. By controlling the displacement distance of the pressing member 31, the degree of tightness or looseness between the pressing member 31 and the bone conduction microphone can be adjusted to simulate the degree of fit between the bone conduction microphone and the human skin, thereby improving the detection accuracy.

It will be appreciated that the second lifting mechanism 32 may be a screw drive mechanism or a cylinder drive mechanism, etc., which is not specifically limited here.

Specifically, the second lifting mechanism 32 comprises a second support plate 321, a connecting rod 322, and at least one second lifting rod 323. Two ends of the connecting rod 322 are respectively connected with the second support plate 321 and the pressing member 31. One end of the second lifting rod 323 is rotatably connected with the fixed frame 10, and the other end of the second lifting rod 323 penetrates through the second support plate 321 and is threadedly connected with the second support plate 321. The second lifting rod 323 is externally connected with a power component used to drive the second lifting rod 323 to rotate. In this embodiment, a second support plate 321 may be additionally provided, which is fixedly connected with the pressing member 31 through the connecting rod 322. Two connecting rods 322 may be provided to improve the stability of connection between the second support plate 321 and the pressing member 31. In order to adjust the lifting displacement of the pressing member 31, at least one second lifting rod 323 may be provided. The second lifting rod 323 may be a screw rod. One end of the second lifting rod 323 is rotatably arranged at the end of the fixed frame 10 that is away from the first clamping assembly 20, and the other end of the second lifting rod 323 penetrates through the second support plate 321 and is threadedly connected with the second support rod. The second lifting rod 323 is externally connected with a power component, such as a motor, to drive the second lifting rod 323 to rotate by the motor, so that the second support plate 321 realizes lifting operation.

Specifically, there are two second lifting rods 323. The second lifting mechanism 32 further comprises two synchronous wheels 324 that are respectively arranged rotatably on ends of the two second lifting rods 323 that face toward the pressing member. The two synchronous wheels 324 are connected through belt transmission, and one of the second lifting rods 323 is externally connected with the power component. In this embodiment, in order to accurately control the lifting displacement of the pressing member 31, two second lifting rods 323 are provided, and the synchronous wheels 324 are arranged rotatably on ends of the two second lifting rods 323 that face toward the first clamping assembly 20. The two synchronizing wheels 324 are synchronously connected through a belt, chain, rack, etc. One of the second lifting rods 323 is externally connected with a power component, such as a motor. The torque of the motor is transmitted to the two second lifting rods 323 through the two synchronizing wheels 324, which makes the second support plate 321 move up or down, so as to control the displacement accuracy of the pressing member 31 by controlling the speed of the motor.

It will be appreciated that, besides the above drive mode, a driving rod 325 may be further provided. One end of the driving rod 325 is rotatably arranged on the fixed frame 10, and the other end of the driving rod 325 penetrates through the second support plate 321 and is rotatably connected with the second support plate 321. A driving wheel 327 is arranged at an end of the driving rod 325 that faces toward the first clamping assembly 20. The driving wheel 327 and two synchronous wheels 324 are connected together by belt, gear or chain transmission.

In addition, a guiding rod 326 may be further provided. One end of the guiding rod 326 is arranged on the fixed frame 10, and the other end of the guiding rod 326 penetrates through the second support plate 321 and is slidably connected with the second support plate 321. When the second support plate 321 slides under force, it slides along the guiding rod 326.

Specifically, the wake-up test device 100 for intelligent voice equipment further comprises an auxiliary clamping mechanism that is arranged on the first clamping assembly 20 and/or the second clamping assembly 30 and used to fix the object to be tested on the vibration exciter 40. In this embodiment, since the bone conduction sensor can have various shapes, the auxiliary clamping mechanism may be provided. For example, the auxiliary clamping mechanism may be provided on the periphery of the mounting member 22 to fixing the bone conduction sensor on the mounting member 22 and prevent it from loosening.

It will be appreciated that the auxiliary clamping mechanism may be a silicone pad, etc. to facilitate simulating human skin.

Figure 5:
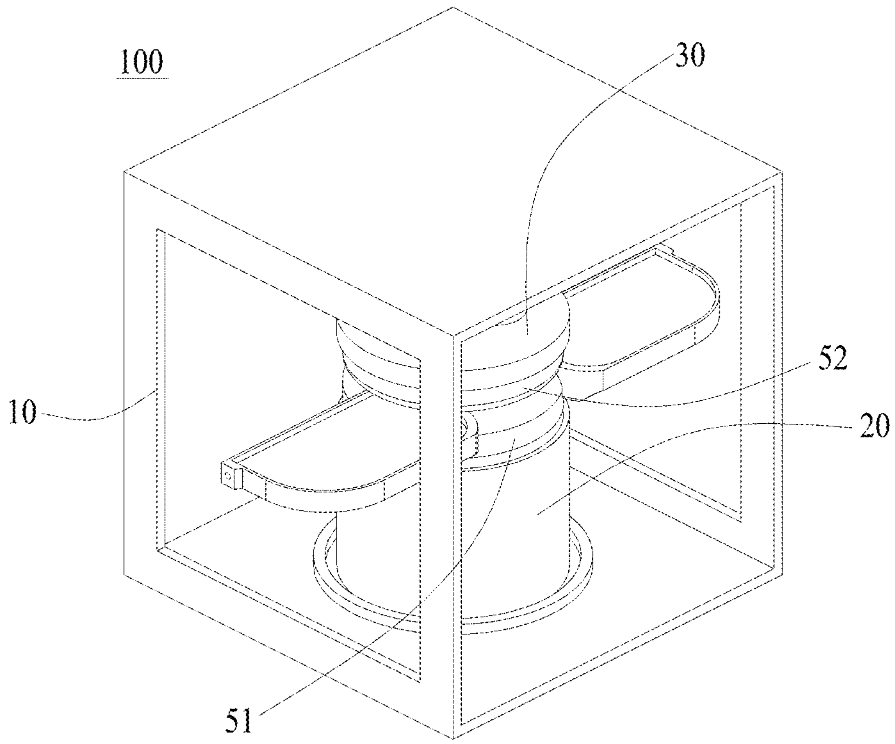
FIG. 5 is a schematic diagram of the structure of yet another embodiment of the wake-up test device for intelligent voice equipment of the present disclosure.

As shown in FIG. 5, specifically, the wake-up test device 100 for intelligent voice equipment further comprises a first air bag 51 and a second air bag 52. The first air bag 51 is arranged on an end of the first clamping assembly 20 that faces toward the second clamping assembly 30. The first air bag 51 has an annular structure, and the vibration exciter 40 is located in the center position of the first air bag 51. The second air bag 52 is arranged on an end of the second clamping assembly 30 that faces toward the first clamping assembly 20. In this embodiment, the first air bag 51 having an annular structure may be provided on the mounting member 22, the vibration exciter 40 is located at the center position of the first air bag 51, and the second air bag 52 is provided on the pressing member 31. The first air bag 51 and the second air bag 52 after inflated fix the bone conduction microphone properly. The air amount of the first air bag 51 and the second air bag 52 can be adjusted according to the degree of tightness or looseness of the bone conduction microphone when it is worn, thereby adjusting the surface softness of the first air bag 51 and the second air bag 52 and thus adjusting the degree of fixation stability of the bone conduction microphone. For example, it can simulate the degree of fit with the skin when worn on the forehead to improve the detection accuracy of the bone conduction microphone.

The above only describes preferred embodiments of the present disclosure, and does not limit the patent scope of the present disclosure. Any equivalent structural substitution made based on the description and drawings of the present disclosure, or direct/indirect application in other related technical fields without going beyond the inventive concept of the present disclosure, shall all be included in the patent protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A wake-up test device for intelligent voice equipment, characterized in comprising:

a fixed frame;

a first clamping assembly arranged on the fixed frame;

a second clamping assembly arranged on the fixed frame, wherein the first clamping assembly and the second clamping assembly can be brought to be close to or far away from each other; and a vibration exciter arranged on the first clamping assembly or the second clamping assembly, wherein an object to be tested is placed on the vibration exciter, the first clamping assembly and the second clamping assembly are brought to be close to each other and fix the object to be tested on the vibration exciter, so that the object to be tested attaches to the vibration exciter, wherein the first clamping assembly comprises:

a fixed member arranged at an end of the fixed frame that is away from the second clamping assembly; and a mounting member arranged at an end of the fixed member that faces toward the second clamping assembly, wherein the mounting member is provided thereon with an annular groove, the vibration exciter is arranged on the mounting member, and the vibration exciter is located at a center position of the annular groove.

2. The wake-up test device for intelligent voice equipment according to claim 1, wherein the mounting member penetrates through the fixed member and is slidably connected with the fixed member, and the first clamping assembly comprises:

a first lifting mechanism arranged on the fixed frame or the fixed member, wherein the first lifting mechanism is connected with the mounting member and is used to drive the mounting member to move close to or away from the second clamping assembly.

3. The wake-up test device for intelligent voice equipment according to claim 2, wherein the first lifting mechanism comprises:

a first support plate fixed on the fixed frame or the fixed member; and a first lifting rod, wherein one end of the first lifting rod is connected with the mounting member, the other end of the first lifting rod penetrates through the first support plate and is threadedly connected with the first support plate, an end of the first lifting rod that is away from the first support plate is externally connected with a power component used to drive the first lifting rod to rotate.

4. The wake-up test device for intelligent voice equipment according to claim 3, wherein the first lifting mechanism further comprises:

a fixed rod, wherein one end of the fixed rod is fixed on the fixed member, and the first support plate is arranged on the fixed rod;

a driving wheel rotatably arranged on an end of the fixed rod that is away from the second clamping assembly; and a driven wheel arranged on an end of the first lifting rod that is away from the second clamping assembly, wherein the driving wheel is connected with the driven wheel through belt transmission, and the driving wheel is externally connected with a power component.

5. The wake-up test device for intelligent voice equipment according to claim 1, wherein the second clamping assembly comprises:

a pressing member; and a second lifting mechanism arranged on an end of the fixed frame that is away from the first clamping assembly, wherein the pressing member is arranged on an end of the second lifting mechanism that faces toward the first clamping assembly, and the second lifting mechanism is used to drive the pressing member to move close to or away from the first clamping assembly.

6. The wake-up test device for intelligent voice equipment according to claim 5, wherein the second lifting mechanism comprises:

a second support plate;

a connecting rod, wherein two ends of the connecting rod are respectively connected with the second support plate and the pressing member; and at least one second lifting rod, wherein one end of the second lifting rod is rotatably connected with the fixed frame, the other end of the second lifting rod penetrates through the second support plate and is threadedly connected with the second support plate, the second lifting rod is externally connected with a power component used to drive the second lifting rod to rotate.

7. The wake-up test device for intelligent voice equipment according to claim 6, wherein there are two second lifting rods, and the second lifting mechanism further comprises:

two synchronous wheels respectively arranged rotatably on ends of the two second lifting rods that face toward the pressing member, wherein the two synchronous wheels are connected together through belt transmission, and one of the second lifting rods is externally connected with the power component.

8. The wake-up test device for intelligent voice equipment according to claim 1, further comprising:

an auxiliary clamping mechanism arranged on the first clamping assembly and/or the second clamping assembly and used to fix the object to be tested on the vibration exciter.

9. The wake-up test device for intelligent voice equipment according to claim 1, further comprising:

a first air bag arranged on an end of the first clamping assembly that faces toward the second clamping assembly, wherein the first air bag has an annular structure, and the vibration exciter is located in a center position of the first air bag; and a second air bag arranged on an end of the second clamping assembly that faces toward the first clamping assembly.

* * * * *